March 11, 1969    J. A. M. STASSART    3,431,801
TOOL SET FOR COPYING MACHINES
Filed March 7, 1967

INVENTOR.
J. A. M. Stassart
BY
Richards & Geier
ATTORNEYS

United States Patent Office 3,431,801
Patented Mar. 11, 1969

3,431,801
TOOL SET FOR COPYING MACHINES
Joseph Antoine Marie Stassart, Jupille-sur-Meuse, Belgium, assignor to Fabrique Nationale d'Armes de Guerre, Societe Anonyme, Herstal-lez-Liege, Belgium
Filed Mar. 7, 1967, Ser. No. 621,199
Claims priority, application Belgium, Mar. 28, 1966, 678,522
U.S. Cl. 82—14                         4 Claims
Int. Cl. B23b *3/28;* B23c *5/00*

ABSTRACT OF THE DISCLOSURE

A series of tools for copying machines the diameters of which vary corresponding to a predetermined modulus and corresponding bushings the diameters of which vary in accordance with a related modulus.

---

In the copying machines of the type comprising a spindle-holding feeler following a jig in accordance with the profile being cut, it is necessary to provide different jigs for each blank as well as for the final pass, said jigs determining respectively the depth of each pass according to the used tool, the tool for the last pass being selected in accordance with the smallest fillet of the plans of the part being cut. When turning by copying complex shapes, the conventional operations comprise using different jigs and tools for successive passes. Since every tool change requires accurately locating the latter, the production rate of such complex parts is substantially slowed down by the numerous necessary adjustments. The difficulties are still increased as the tools must be frequently replaced for regrinding, each of said replacing operations requiring in turn a careful positioning of the replacing tool.

It is an object of the present invention to avoid these drawbacks by providing a tool set consisting of the combination of a series of tools shaped as truncated buttons having cutting diameters stepped according to a predetermined modulus and a series of tubular bushings having outer diameters stepped according to a modulus in correlation with that of the said tool buttons. This new tool set makes it possible, on one hand, copying complex shapes the tangents of which may form any angle between 0° and 180° with the direction of the longitudinal or transverse movement of the tool whatever the radius of the used buttons may be, provided the latter have a radius smaller than the fillets required on the drawings by using, upon the spindle of the feeler, the bushing having a radius corresponding to that of the tool being used and, on the other hand, copying such complex shapes from a rough part by means of only one jig to the final outline being provided without using intermediate jigs, the buttons and the bushings of the followed feeler spindle being selected among the above series.

According to a feature of this invention, at least several and, if desired, all the buttons of a series are provided with the same anchoring truncated tails in such manner that said buttons are interchangeable without changing the toolholder and without any further adjustment of the single used toolholder upon the machine.

According to another feature of this invention, the stepping of the cutting diameter, the tool buttons and the tubular bushings is determined according to a modulus depending upon the reduction of the cutting diameter of a tool after a usual regrinding in such manner that any tool of a series, the first one being excepted, may be located, after regrinding, at the position of the preceding tool within said series. For that purpose, the tool buttons of the same series or at least a plurality thereof will have an identical conicity.

The characteristics and the advantages of this invention will be more clearly pointed out by the following description of an embodiment thereof given by way of illustration and without any limitation, reference being made to the appended drawings in which.

Figure 1:
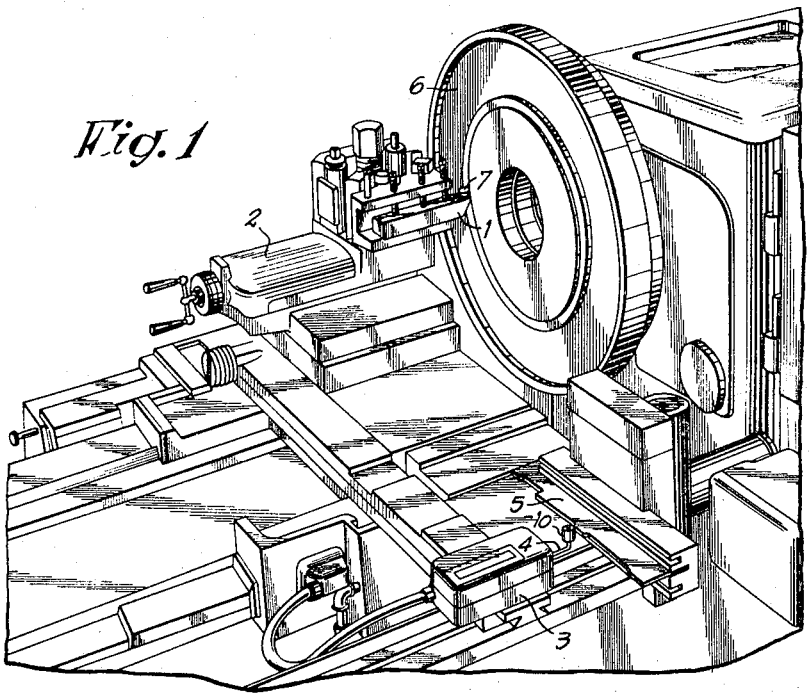
FIGURE 1 is a diagrammatic perspective view of a copying lathe allowing the use of a tool set according to the invention.
Figures 2, 3:
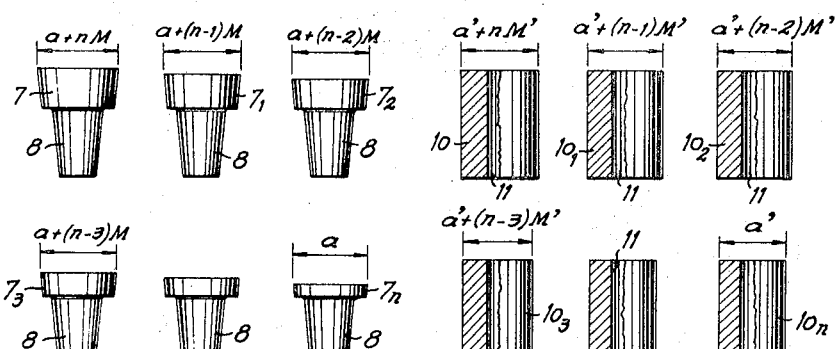
FIGURE 2 shows a series of tool buttons according to the invention.
FIGURE 3 shows a corresponding series of bushings according to the invention.
Figure 4:
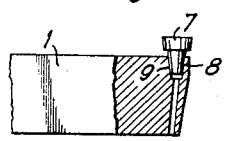
FIGURES 4 and 5 show diagrammatically the location of a tool button of the series represented in FIGURE 2 on a toolholder and the location of a bushing of the series according to FIGURE 3 upon the spindle of a feeler, respectively.
Figure 5:
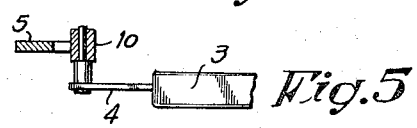

The tool set according to the invention may be used, for instance, upon a copying lathe such as represented in FIGURE 1. This figure represents a toolholder 1 secured to the carriage 2 of the lathe which is provided with a feeler 3 having a spindle 4. In the conventional machines of that type, this spindle 4 is designed to follow a jig 5 shaped in accordance with the profiles being made on the part 6.

The tool set according to the invention comprises a series of tool buttons 7, $7_1$, $7_2$, $7_3$, . . . , $7_n$. The diameters of the cutting circumference of said buttons 7 are stepped according to a predetermined modulus M. Preferably, said modulus M is selected in accordance with the reduction of the diameters of the cutting circumference of a tool after usual regrinding in such manner that a tool, i.e., $7_3$, may be located, within the series and after usual regrinding, at the position of the preceding tool, namely $7_2$. The tools 7 are each provided with a truncated anchoring tail 8, the diameter of the large base of which is smaller than the diameter of the small base of tool 7, said tail 8 being inserted into a truncated bore 9 of a toolholder 1. Preferably, several successive tools of the same series or all the tools of the same series are provided with the same anchoring tail 8 in such manner that the said tools may be used equally upon the same toolholder 1.

The tool set according to the invention comprises also a series of tubular bushings 10, $10_1$, $10_2$, $10_3$, . . . $10_n$; the outer diameters of which are stepped according to a modulus M' in correlation with that of the said buttons 7. Each of said bushings is provided with the same axial bore 11 the diameter of which is slightly greater than the outer diameter of the spindle 4 of the feeler 3.

The above described tool set allows equally the following operations being made:

(1) Copying complex shapes the tangents of which may form any angle between 0° and 180° with the direction of the longitudinal or transverse movement of carriage 2, whatever the radius of the used buttons 7 may be, provided the latter have a radius smaller than the fillet required on the drawings, by using, upon the spindle 4 of the feeler 3, the bushing 10 having a radius corresponding to that required;

(2) Copying complex shapes the tangents of which may form any angle between 0° and 180° with the direction of the longitudinal or transverse movement of carriage 2 from the rough part by means of only one jig 5 to the final outline being provided without using any intermediate jig, by means of buttons 7 and bushings 10 having a suitable radius.

In the second embodiment described in the foregoing, the first blank may be made, for instance, by means of a bushing 10 having a radius equal to that of button 7 plus several times the bushing radius in such manner that the first blank pass is carried out at a depth representing 90% of the radius of button 7. The second blank will be made in the same manner as the first bank at a depth representing 90% of the button radius by using a bushing the radius of which is that of the first pass less one time the button radius. When going on step by step in the same manner, the final pass will give the profile required by the jig. This process allows avoiding any intermediate locating adjustment as well as the locating adjustments of the tools when they are replaced. In addition, the locating axis 9 of the cone 8 of the toolholder 1 being kept stationary when machining a complete series, it is only sufficient to replace the button 7, when required, together with bushing 10 of spindle 4 of feeler 3 for the intended depth.

Thus, by avoiding the conventional careful locating operations, the daily production rate of a machine may be substantially increased.

What I claim is:

1. A tool set for copying machines of the type comprising a feeler the spindle of which is designed to follow a jig in accordance with the profile being cut, characterized in that it comprises the combination of a series of tools shaped as truncated buttons having diameters stepped according to a predetermined modulus and a series of tubular bushings having outer diameters stepped according to a modulus in correlation with that of the said tool buttons.

2. A tool set according to claim 1, characterized in that the said tool buttons are each provided with a truncated anchoring tail, at least several buttons of the same series being provided with an identical anchoring tail.

3. A tool set according to claim 1, characterized in that each bushing of said series has the same axial cylindrical bore of a diameter slightly greater than the diameter of said feeler spindle.

4. A tool set according to claim 1, characterized in that the said modulus determining the stepping of the diameters of the buttons of a series is established in accordance with the reduction of the diameter of the cutting circumference of a give tool after normal regrinding.

References Cited

UNITED STATES PATENTS 112,379   3/1871   Pratt _____ 82—14

GERALD A. DOST, *Primary Examiner.*

U.S. Cl. X.R.

90—62